United States Patent
Bath et al.

(10) Patent No.: US 11,162,240 B2
(45) Date of Patent: Nov. 2, 2021

(54) HYDRAULIC EXCAVATION AND DELIVERY DEVICE

(71) Applicant: Deepwater Corrosion Services, Inc., Houston, TX (US)

(72) Inventors: William Robert Bath, Houston, TX (US); Ian Roberts, Houston, TX (US)

(73) Assignee: DEEPWATER CORROSION SERVICES, INC.

( * ) Notice: Subject to any disclaimer, the term of this patent is extended or adjusted under 35 U.S.C. 154(b) by 367 days.

(21) Appl. No.: 16/081,281

(22) PCT Filed: Mar. 3, 2017

(86) PCT No.: PCT/US2017/020825
§ 371 (c)(1),
(2) Date: Aug. 30, 2018

(87) PCT Pub. No.: WO2017/152147
PCT Pub. Date: Sep. 8, 2017

(65) Prior Publication Data
US 2019/0071842 A1   Mar. 7, 2019

Related U.S. Application Data

(60) Provisional application No. 62/303,228, filed on Mar. 3, 2016.

(51) Int. Cl.
*F16L 1/16* (2006.01)
*E02F 3/92* (2006.01)
(Continued)

(52) U.S. Cl.
CPC .............. *E02F 3/925* (2013.01); *C23F 13/02* (2013.01); *C23F 13/18* (2013.01); *C23F 13/20* (2013.01);
(Continued)

(58) Field of Classification Search
CPC ..... E02F 3/8858; E02F 3/8866; E02F 3/8875; E02F 3/92; E02F 3/9218; E02F 3/925; F16L 1/16; F16L 1/166
(Continued)

(56) References Cited

U.S. PATENT DOCUMENTS 3,505,826 A   4/1970   Harmstorf
3,751,927 A   8/1973   Perot, Jr.
(Continued)

*Primary Examiner* — Gary S Hartmann
(74) *Attorney, Agent, or Firm* — Jonathan Pierce; Pierre Campanac; Porter Hedges LLP

(57) ABSTRACT

The present invention is a hydraulic excavation and delivery device capable of hydraulically removing soil overburden from a buried structure, like a pipeline, and delivering an article, such as an electro-mechanical connector for attachment to the buried structure. Hydraulic excavation is achieved by directing a stream of fluid at soil adjacent to and inside an open bottom region of the device to simultaneously dislodge adjacent soil, suspend dislodged soil in the accumulating fluid and form a pit that the device may fit within. Delivery of article is achieved by: (1) loading an article into the tool; (2) advancing the device toward the buried structure by deepening the pit without significant failure (slumping or sagging) of the pit walls until a portion of the buried structure is exposed and within the device; (3) landing the device on the exposed portion of the structure; (4) fixing the article to the exposed portion of the structure; and (5) releasing the article from the device.

20 Claims, 8 Drawing Sheets

(51) Int. Cl.
*E02F 3/88* (2006.01)
*C23F 13/02* (2006.01)
*C23F 13/20* (2006.01)
*C23F 13/18* (2006.01)

(52) U.S. Cl.
CPC .......... *E02F 3/8866* (2013.01); *E02F 3/9218* (2013.01); *F16L 1/166* (2013.01); *C23F 2213/31* (2013.01); *C23F 2213/32* (2013.01); *E02F 3/8858* (2013.01)

(58) Field of Classification Search
USPC ............................ 37/307, 323; 405/158, 159
See application file for complete search history.

(56) References Cited

U.S. PATENT DOCUMENTS

| | | | |
|---|---|---|---|
| 3,786,642 A | 1/1974 | Good et al. | |
| 4,041,717 A | 8/1977 | Dressel et al. | |
| 4,087,981 A | 5/1978 | Norman | |
| 4,102,145 A * | 7/1978 | van Steveninck | F16L 1/201 405/159 |
| 4,190,382 A | 2/1980 | Schmitz et al. | |
| 4,295,757 A | 10/1981 | Gaspar | |
| 4,330,225 A | 5/1982 | Glasgow et al. | |
| 4,479,741 A * | 10/1984 | Berti | E02F 5/107 405/163 |
| 4,741,646 A | 5/1988 | Hatch | |
| 4,992,000 A | 2/1991 | Doleshal | |
| 5,970,635 A | 10/1999 | Wilmoth | |
| 6,705,029 B2 | 3/2004 | Anderson | |
| 8,882,389 B2 * | 11/2014 | Bastesen | F16L 1/26 405/169 |
| 8,899,877 B2 | 12/2014 | Lazzarin et al. | |
| 8,939,678 B2 * | 1/2015 | Lazzarin | E02F 5/04 405/163 |
| 2012/0216435 A1 * | 8/2012 | Wen | E02F 3/902 37/323 |
| 2020/0080282 A1 * | 3/2020 | Bath | E02F 5/10 |

* cited by examiner

SECTION A-A

SECTION A-A

SECTION B-B

SECTION A-A

SECTION B-B

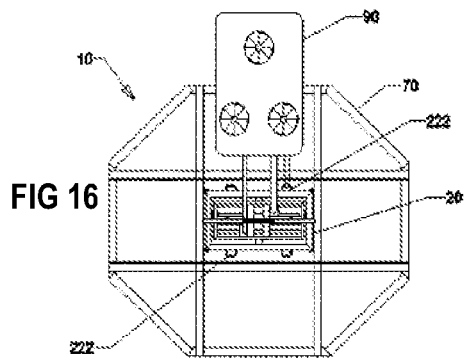
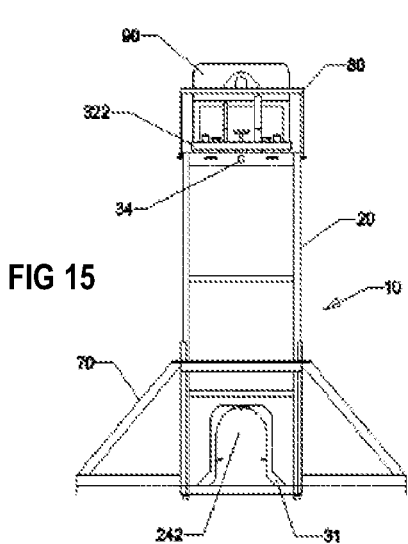
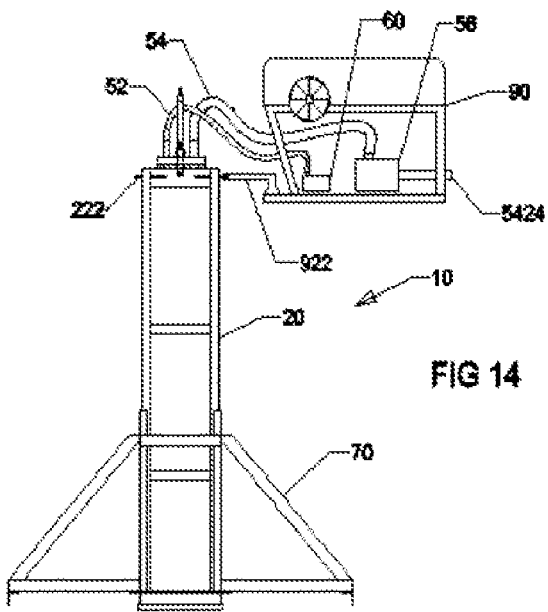

HYDRAULIC EXCAVATION AND DELIVERY DEVICE

CROSS-REFERENCE TO RELATED APPLICATION

This application claims the benefit of U.S. Provisional Application No. 62/303,228, filed Mar. 3, 2016.

BACKGROUND OF INVENTION

Field of Invention

The present invention relates generally to devices or tools capable of excavating soil to reveal a portion of a buried structure, such a pipeline, cable or tunnel. More particularly, the present invention relates to a hydraulic excavation and delivery device or tool capable of (1) burying itself using a combination of fluid jetting and evacuation to displace soil around and within the device or tool and (2) mounting an article, such as a clamp or an electro-mechanical connector, to a pipeline, cable or tunnel. Such device or tool is capable of operating on land, beneath the water and/or a combination thereof.

Structures that are buried, such a pipelines, cables or tunnels are readily susceptible to damage from foreign objects, the surrounding soil, corrosion and/or a combination thereof. Buried structures may be fitted with articles such as sacrificial anodes that require replacement. Other buried structures may require repair by fitting an article such as a splice housing over a damaged area of a cable. Yet other buried structures, like a tunnel, may require repair or adaptation by installing a patch or sealable cover. But to generally accomplish such tasks, the soil overburdening the buried structure must be removed to gain access to the affected area. A specific example related to subsea pipelines is set forth below to illustrate the challenges facing the installation and maintenance of a cathodic protection system.

For example, pipelines can be protected from corrosion by external, sacrificial anodes that are electrically connected to the pipeline. These anodes are commonly installed after the pipeline is laid on the seafloor. In other cases, the anodes must be replaced after the original anodes are sufficiently corroded away. In shallow water, down to about 200 feet, the pipeline is required to be buried up to 6 feet deep. In either case, the anode has to be electrically connected to the pipeline in order to provide the required corrosion protection. The electrical connection is commonly provided by a purpose built electro-mechanical connector that makes the required connection by a mechanical screw that pierces the pipeline coating and makes electrical contact with the pipeline.

The common method for installing the electro-mechanical connector requires that a relatively large area of the seafloor be excavated to form a pit around the location where the electro-mechanical connector is to be installed. This pit is commonly created by divers operating from a support vessel that is anchored above the work site by a 4-point (or more) anchor system. The divers use common subsea dredging tools to create a large diameter pit around the site where the electro-mechanical connector will be installed. The size of the pit is determined by the angle of repose of the soil around the electro-mechanical connector. A shallow angle of repose is required to provide a safe workspace for the divers to install the electro-mechanical connector. The economic impact of this activity, including time to anchor the vessel, time for dredging the pit, and vessel equipment for anchoring and dredging, makes up more than half the cost of each electro-mechanical connector installation. Similar costs face those required to fit articles to buried structures on land or in a marsh.

BRIEF SUMMARY OF THE INVENTION

The present invention is directed at a hydraulic excavation and delivery device capable of hydraulically removing the soil overburden from a buried structure, like a pipeline, and delivering an article, such as an electromechanical connector, for attachment to the buried structure. Hydraulic excavation is achieved by directing a stream of fluid at soil at the soil adjacent to and inside an open bottom region of the device or tool to simultaneously dislodge the adjacent soil, suspend the dislodged soil in the accumulating fluid and form a pit that the device or tool may fit within. Delivery of the article is achieved by: (1) loading an article into the tool or device; (2) advancing the device or tool toward the buried structure by deepening the pit without significant failure (slumping or sagging) of the pit walls until a portion of the buried structure is exposed and within the device or tool; (3) landing the device or tool on the exposed portion of the structure; (4) fixing the article to the exposed portion of the structure; and (5) releasing the article from the device or tool. In its most basic embodiment, the present invention includes an enclosure with an open bottom, an aperture formed in the lower region of the enclosure, a fluid jetting system and a slurry evacuation system fixed to the enclosure, an article alignment system and an article loaded into the article alignment system.

BRIEF DESCRIPTION OF THE SEVERAL VIEWS OF THE DRAWINGS

FIGS. 1 and 1A are elevation views of a hydraulic excavation and delivery device with an article loaded and positioned above a buried structure.

FIG. 14 is an elevation view of another embodiment of a hydraulic excavation and delivery device held by a remotely operated vehicle.

FIG. 15 is an elevation view of another embodiment of a hydraulic excavation and delivery device held by a remotely operated vehicle.

FIG. 16 is a plan view of another embodiment of a hydraulic excavation and delivery device held by a remotely operated vehicle.

DETAILED DESCRIPTION OF THE PREFERRED EMBODIMENTS

Figure 1:
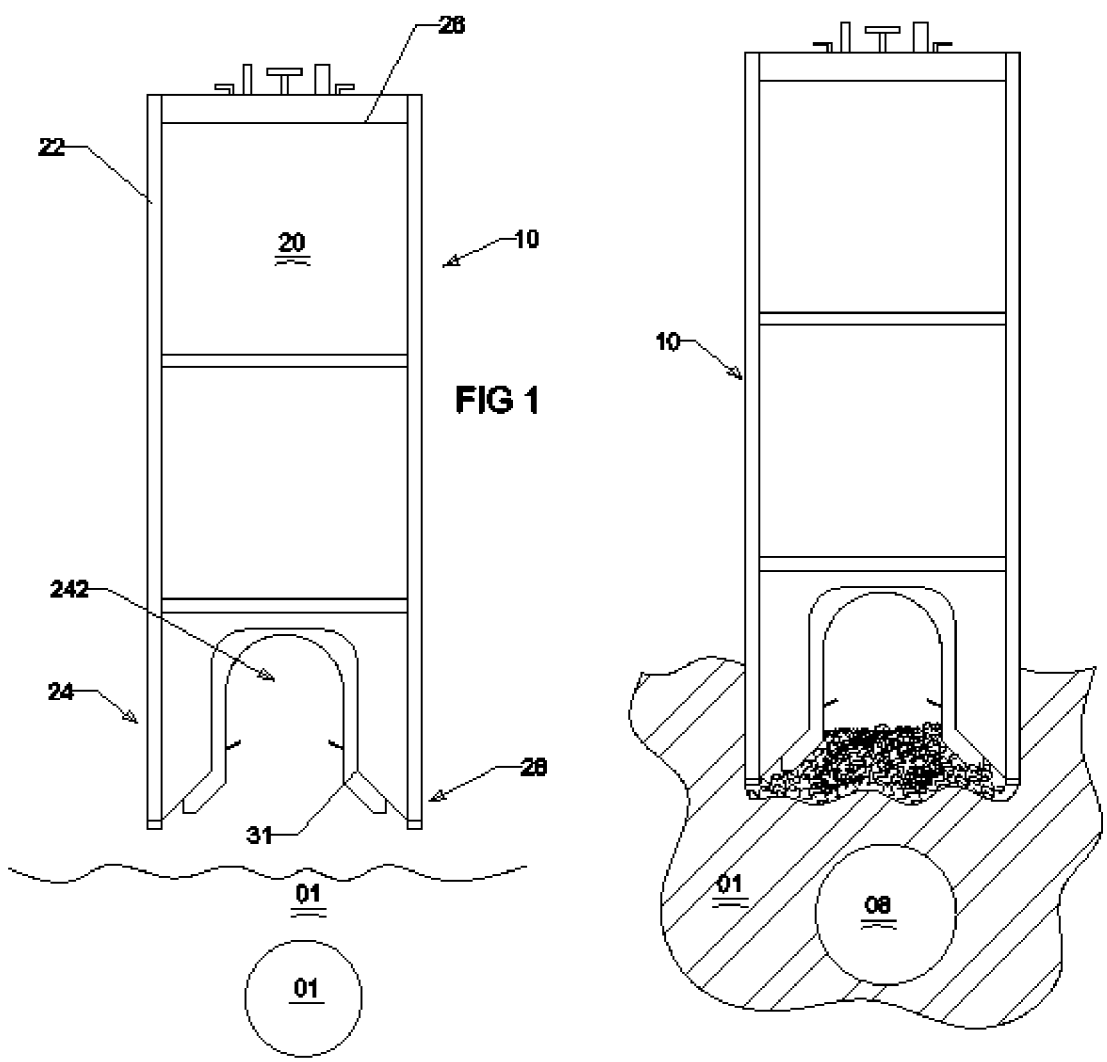

The present invention is a hydraulic excavation and delivery device 10 for a structure 08 buried in soil 01. The hydraulic excavation and delivery device 10 includes a fluid jetting system 52, slurry evacuation system and an article alignment system 30 fixed to an enclosure 20. An article 31 is loaded onto an article alignment system 30 for release when article 31 is on or adjacent to an exposed region of buried structure 08. See FIG. 1.

In one embodiment, enclosure 20, fluid jetting system 52 and slurry evacuation system 54 operate simultaneously to form an eductor 50 with an article alignment system 30 within eductor 50. In another embodiment, fluid jetting system 52 and slurry evacuation system 54 are configured to operate independent of each other or operate simultaneously. It is contemplated that in certain circumstances, such as operations on land where soil 01 slopes away from a hydraulic excavation and delivery device 10, operation of a slurry evacuation system 54 will be intermittent during the operation of a fluid jetting system 52.

Figure 4:
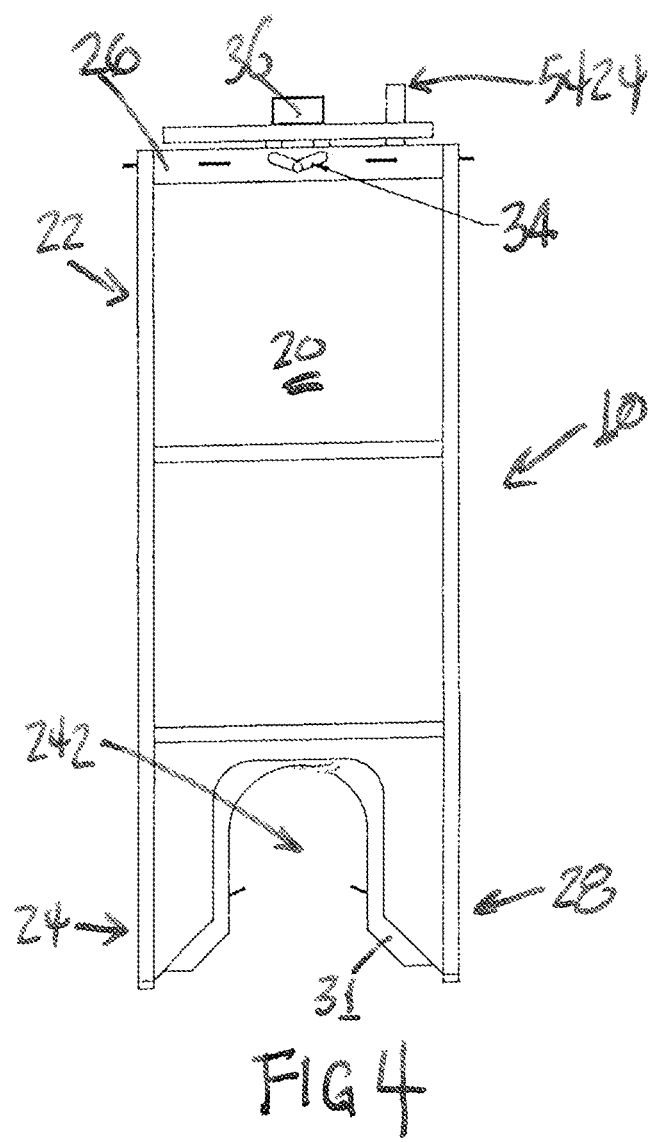
FIG. 4 is an elevation view of another embodiment of a hydraulic excavation and delivery device depicting elements of an enclosure, a pivot for an article delivery system, and elements of a slurry evacuation system.

The present invention contemplates an enclosure 20 having upper and lower regions 22, 24. An open bottom 28 is located at a lower region 24. See FIGS. 1, 4. An aperture 242 is formed in lower region 24. See FIGS. 1, 4. Aperture 242 includes a shape similar to the periphery of the structure 08 to be uncovered. For example, if the structure 08 is a pipe, then aperture 242 would have an arcuate shape set at a sufficient distance from an open bottom 28 to allow landing and/or coupling of an enclosure 20 on an exposed portion of structure 08. In a preferred embodiment, a sliding shutter 244 is fixed to enclosure 20 to cover a region of aperture 242 above soil 01 line, thereby eliminating or at least reducing ingress of soil as the enclosure 20 moves toward the buried structure 08. In a preferred embodiment, a pair of opposing apertures 242 is formed in lower region 24 to allow enclosure 20 to straddle structure 08. In another embodiment, a pair of apertures 242 generally perpendicular to each other are formed in lower region 24 to allow enclosure 20 to land and/or couple with a similar shaped buried structure 08, such as an elbow or radius turned pipe, cable or tunnel. In yet another preferred embodiment, lower region 24 is configured to mount removable plates 246 having different sized apertures 242; thereby allowing enclosure 20 to land and/or couple with a wider range of buried structures 08.

Figure 2:
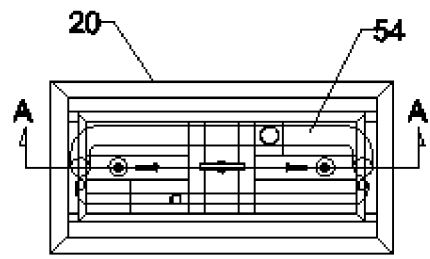
FIG. 2 is a plan view of a hydraulic excavation and delivery device.
Figure 3:
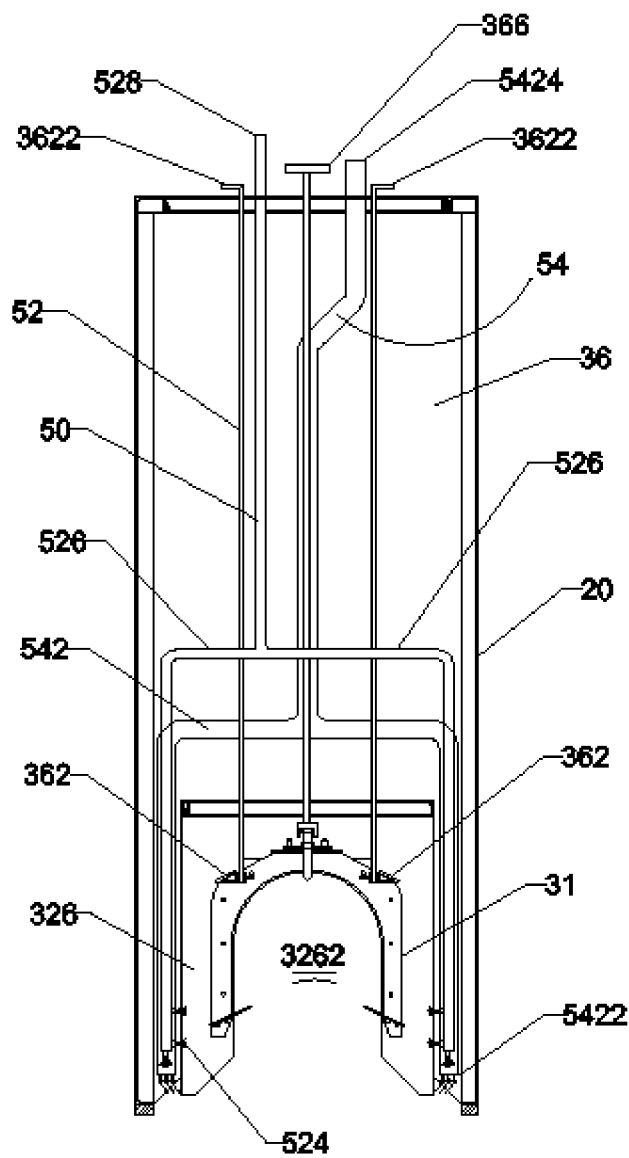
FIG. 3 is a cross sectional view of a hydraulic excavation and delivery device depicting an enclosure, elements of an eductor including (including but not limited to) an article delivery system, a fluid jetting system, and a slurry evacuation system.
Figure 5:
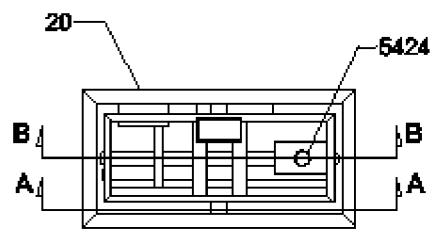
FIG. 5 is a plan view of another embodiment of a hydraulic excavation and delivery device depicting an enclosure and an element of a slurry evacuation system.
Figure 9:
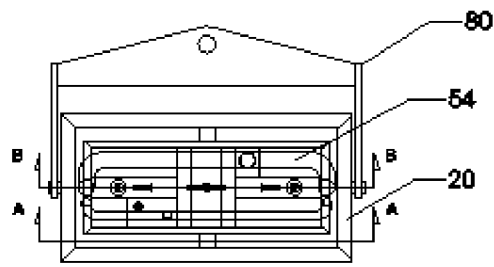
FIG. 9 is a plan view of another embodiment of a hydraulic excavation and delivery device depicting an enclosure, elements of a slurry evacuation system and a lifting beam.

In a preferred embodiment, enclosure 20 includes generally vertical exterior walls with smooth surfaces to promote movement through soil 01. Enclosure 20 can be constructed from any durable material including but not limited to steel, stainless steel, carbon fiber or a combination thereof. In a preferred embodiment, enclosure 20 is constructed of steel and has a rectangular plan cross section. FIGS. 2, 5 and 9.

In a preferred embodiment, enclosure 20 is mounted on a sliding bearing system 71 within a footing frame 70 as shown in FIGS. 12-16. Foot fame 70 promotes a generally upright orientation of enclosure 20 when first landed on soil 01. Enclosure 20 slides inside footing frame 70.

In a preferred embodiment, a lifting beam 80 is attached to enclosure 20 at an upper region as shown in FIG. 9 for easier deployment of hydraulic excavation and delivery device 10. A stop 248 fixed to a lower region 24 of enclosure 20 prevents footing frame 70 from sliding off enclosure 20 when hydraulic excavation and delivery device 10 is lifted.

An article delivery system 30 includes an article latch system 36 fixed to a frame 32 that in turn is fixed to enclosure 20 by a pivot 34. See FIGS. 4, 6 and 10. It is contemplated that pivot 34 can have up to six degrees of freedom. In a preferred embodiment, pivot 34 is configured with three degrees of freedom. In a preferred embodiment, pivot 34 is located at an upper region of enclosure 20. In another embodiment, pivot 34 is located between upper and lower regions 22, 24 or enclosure 20. In yet another embodiment, pivot 34 is located at a lower region of enclosure 20.

Figure 6:
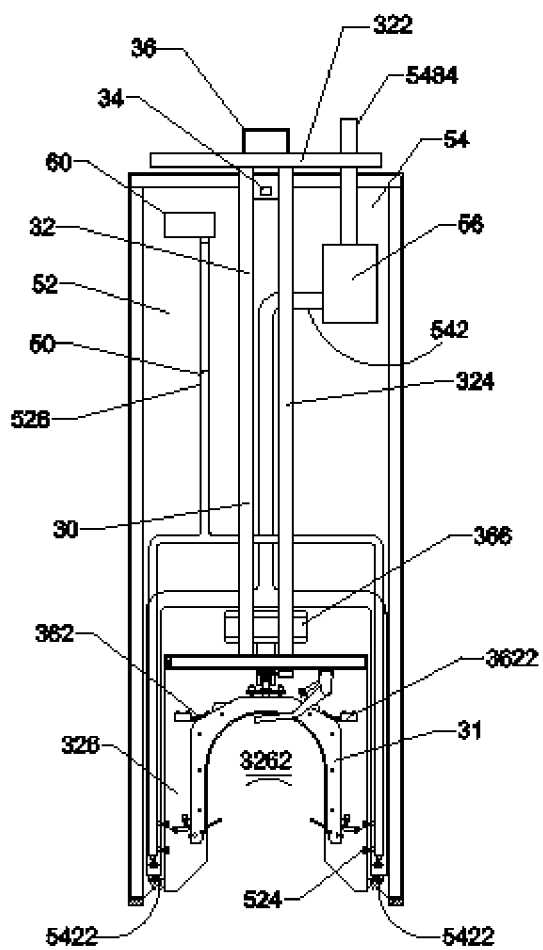
FIG. 6 is a cross sectional view of another embodiment of a hydraulic excavation and delivery device depicting elements of an article alignment system, fluid jetting system and a slurry evacuation system.
Figure 7:
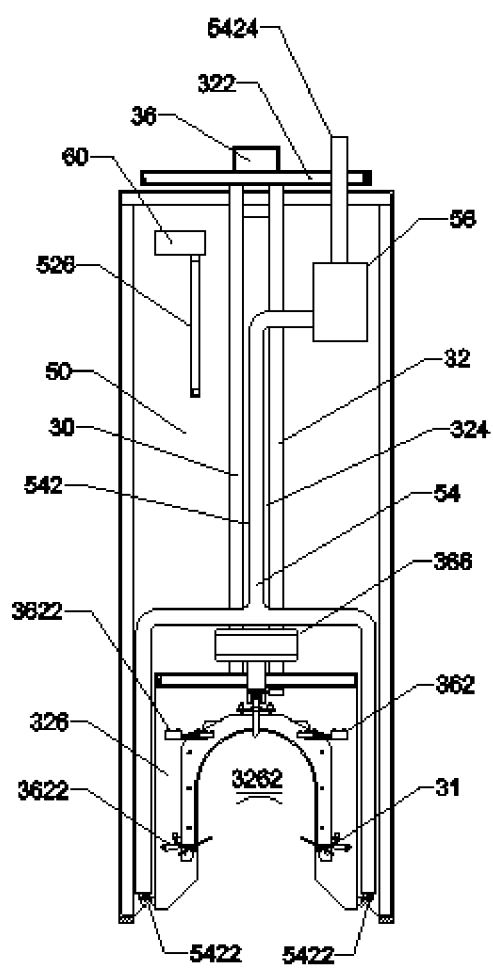
FIG. 7 is a cross sectional view of another embodiment of a hydraulic excavation and delivery device depicting elements of an article alignment system, fluid jetting system and a slurry evacuation system.
Figure 10:
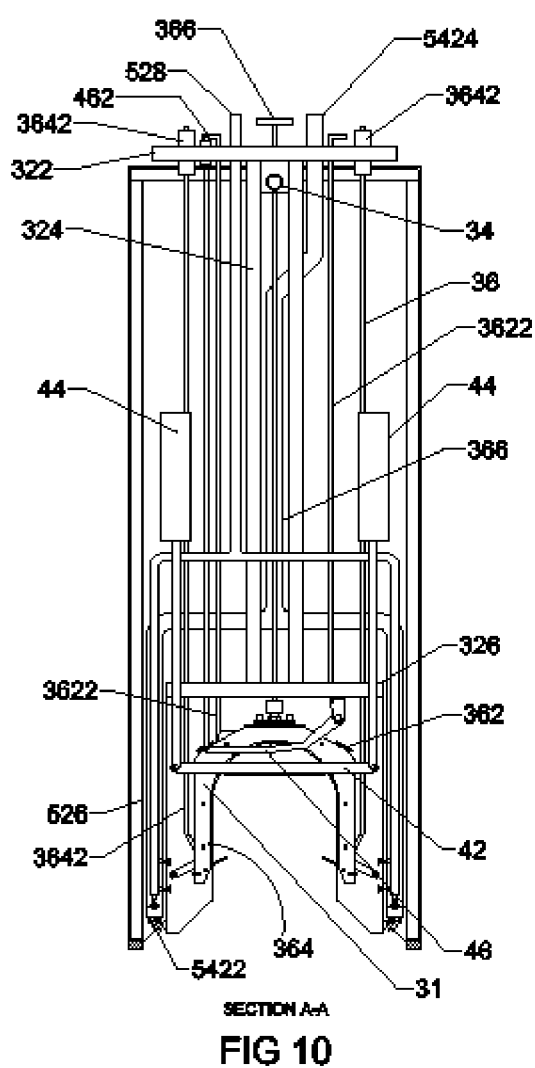
FIG. 10 is a cross sectional view of another embodiment of a hydraulic excavation and delivery device depicting elements of an enclosure, article alignment system, landing system, fluid jetting system and slurry evacuation system.
Figure 11:
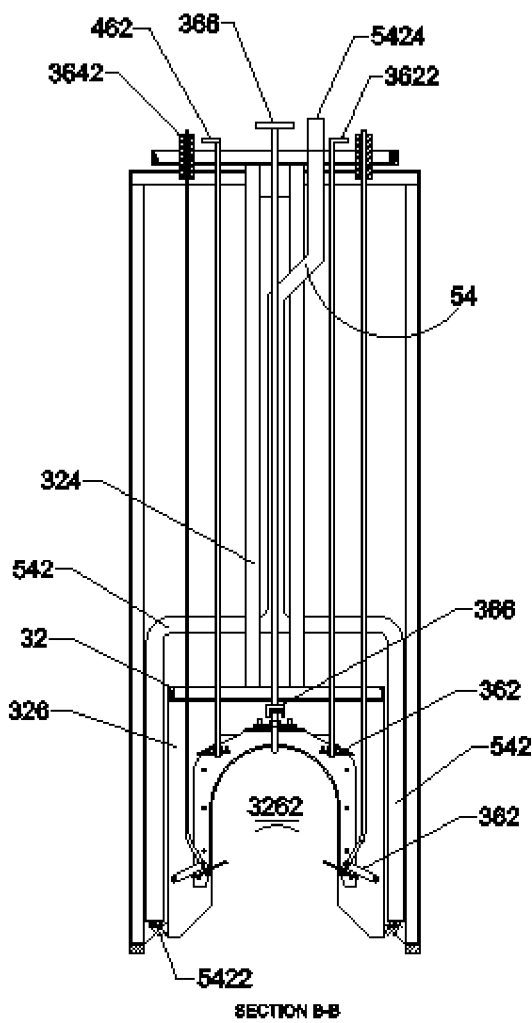
FIG. 11 is a cross sectional view of another embodiment of a hydraulic excavation and delivery device depicting elements of an article alignment system, landing system, fluid jetting system and slurry evacuation system.
Figure 12:
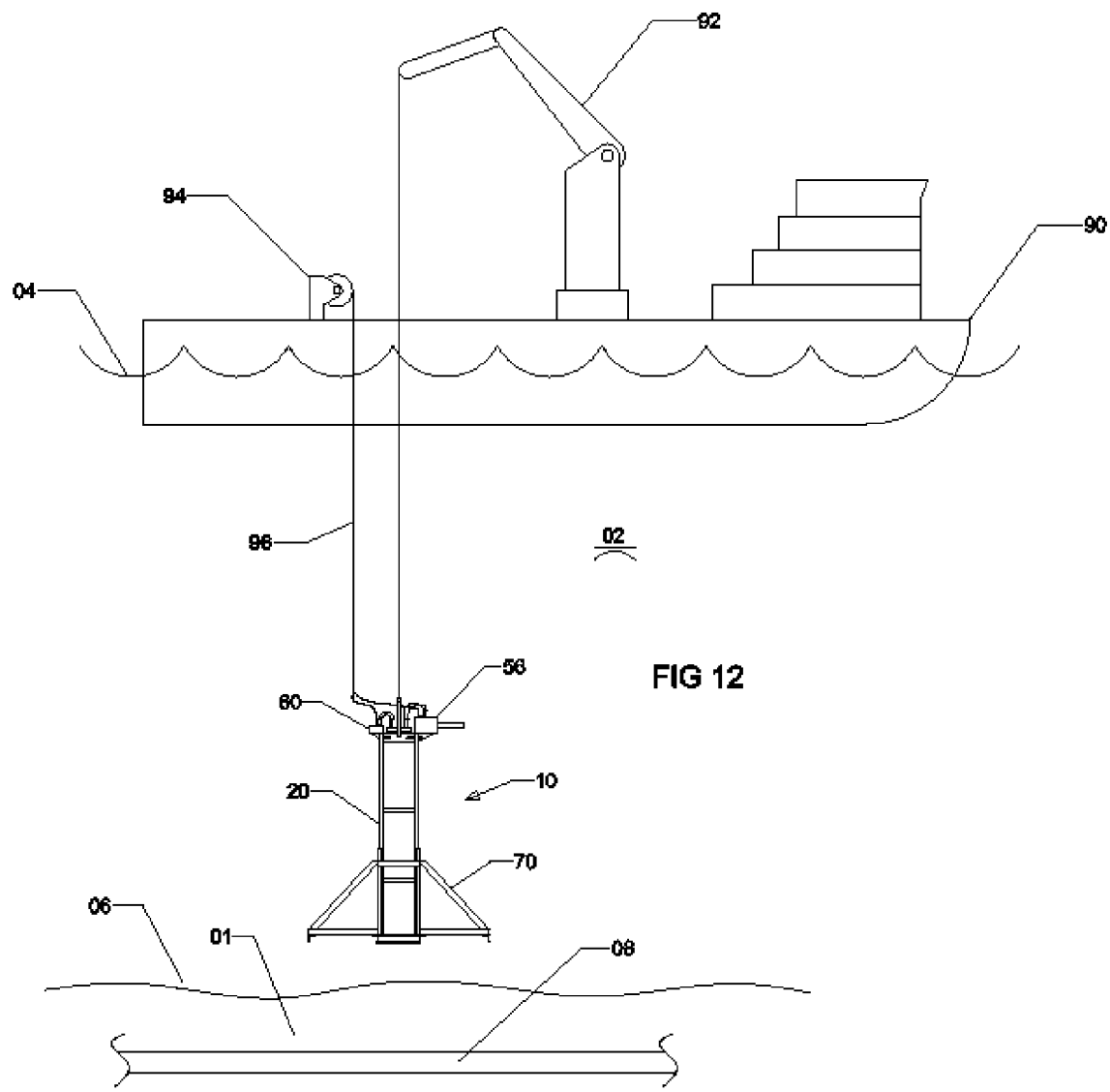
FIG. 12 is an elevation view of another embodiment of a hydraulic excavation and delivery device supported by a watercraft above a buried structure.
Figure 13:
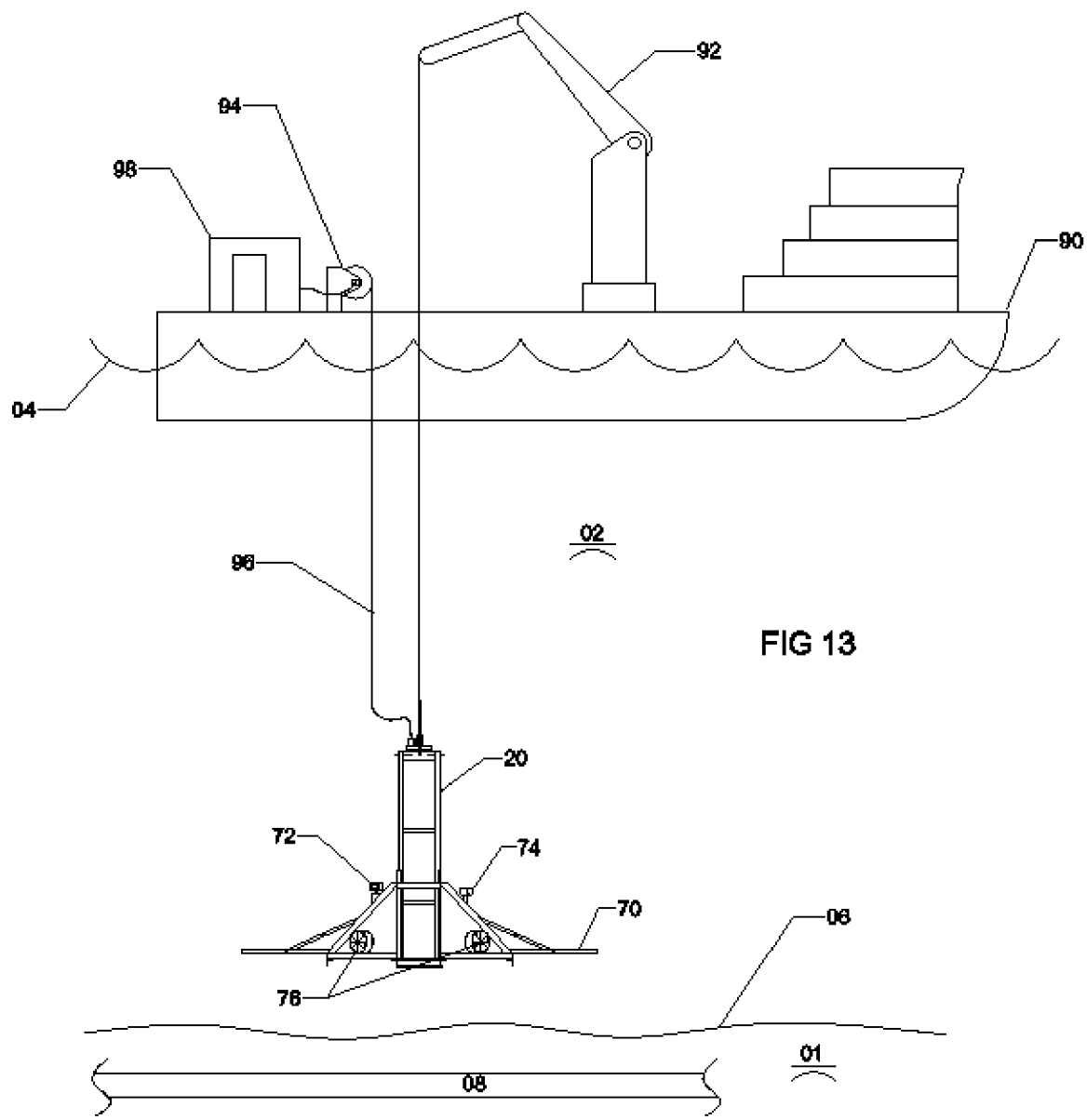
FIG. 13 is an elevation view of another embodiment of a hydraulic excavation and delivery device supported by a watercraft above a buried structure.

Frame 32 includes a web 324 fixed between a control frame 322 and an alignment frame 326. See FIG. 10. In a preferred embodiment, a majority of article delivery system 30 is located within enclosure 20. In a preferred embodiment, a portion of web 324 projects out from an upper region 22 of said enclosure 20 and control frame 322 is positioned external to said enclosure 20 as shown in FIGS. 6 and 10. In a preferred embodiment, a plurality of passages 3222 is formed in and passes through control frame 322. Each of such passages 3222 may be configured to accommodate a corresponding latch actuator 3622, article in position indicator 3642, article actuator 366, landing indicator 462, slurry outlet 5424 or a combination thereof. See FIGS. 6-11. A recess 3262 is formed in alignment frame 326. Recess 3262 generally has the same shape as an adjacent aperture 242 to allow proper alignment and delivery of article 31 to structure 08. See FIGS. 6 and 11.

Article 31 is loaded and held in place on alignment frame 326 by a latch 362 or a number of latches 362. See FIGS. 3, 6, 7, 10 and 11. A latch actuator 3622 operates a latch 362 or a number of latches 362 to hold or release article 31. In a preferred embodiment, latch actuator 3622 is a reach rod. In another embodiment, latch actuator 3622 is a device that can be operated electrically, mechanically, hydraulically or a combination thereof from a location remote from enclosure 20.

An article in position sensor 364 is fixed to alignment frame 326 and senses when article 31 is in alignment with structure 08. Article in position sensor 364 is operatively connected to article in position indicator 3642 such that when article 31 is in alignment with structure 08, article in position indicator 3642 indicates such condition. It is contemplated that article in position sensor 364 senses the position of article 31 mechanically, electrically, hydraulically, or a combination thereof and such condition (or non-condition) can be conveyed to an article in position indicator 3642 mechanically, electrically, hydraulically or a combination thereof. In a preferred embodiment, article in position indicator 3642 is a rod that passes through a passage 3222 formed in control frame 322. See FIGS. 10 and 11. In another embodiment, article in position sensor 364 is an electro-mechanical device that sends a signal to an article in position indicator 3642 that is remote to enclosure 20.

In a preferred embodiment, an article actuator 366 is coupled to an article 31 while enclosure 20 is adjacent to structure 08. Article actuator 366 is configured to operate at least one function of an article 31 when in close proximity or in contact with a structure 08. In another embodiment, article actuator 366 is a device that can operate at least one function of article 31 by electrical signals, mechanical force, hydraulic force or a combination thereof. In a preferred embodiment, article 31 is an electro-mechanical connector fixed to a clamping framework for a cathodic protection system. In such an embodiment, article actuator 366 is a reach rod extending through a passage 3222 formed in control frame 322 and mechanically forces electro-mechanical connector to penetrate at least a surface of a structure 08 to create a proper bond for a cathodic protection system. See FIGS. 10 and 11. In another embodiment, article 31 is a NDT thickness gauge electrically operated by an article actuator 366. In another embodiment, article 31 is a hydraulic clamp hydraulically operated by an article actuator 366. The above described article actuator 366 embodiments are illustrative rather than limiting examples.

In yet another preferred embodiment, hydraulic excavation and delivery device 10 includes a landing system 40 to at least reduce the landing force of enclosure 20 on structure 08. Landing system 40 includes a dashpot 44 fixed between enclosure 20 and a landing bar 42 positioned across an interior region of aperture 242 and recess 3262. See FIGS. 8 and 10. In a preferred embodiment, landing system 40 further includes a landing sensor 46 and a landing indicator 462. Landing sensor 46 is operatively connected to a landing indicator 462 such that when structure 08 is position at a user define location within recess 3262, landing indicator 462 indicates such condition. It is contemplated that landing sensor 42 senses contact between landing bar 42 and structure 08 mechanically, electrically, hydraulically, or a combination thereof and such condition (or non-condition) can be conveyed to a landing indicator 462 mechanically, electrically, hydraulically or a combination thereof. In a preferred embodiment, landing indicator 462 is a rod that passes through a passage 3222 formed in control frame 322. See FIGS. 10 and 11. In another embodiment, landing sensor 46 is an electro-mechanical device that sends a signal to a landing indicator 462 that is remote to enclosure 20.

Fluid jetting system 52 includes a fluid source 100 fluidly connected to a suction side of a pump 60. A discharge side of pump 60 is fluidly connected to a first end of a conductor 526. See FIGS. 3, 6, 7 and 10. A jetting nozzle 524 is fluidly connected to a second end of conductor 526. Jetting nozzle 524 is positioned within enclosure 20 to: optimize simultaneous fluid introduction at a user selected flow rate within an enclosure 20; hydraulically excavate soil 01 within a lower region 24 of enclosure 20; and create a slurry 104 of fluid 102 and soil 01 within enclosure 20. In a preferred embodiment, pump 60 is located on or in enclosure 20. See FIGS. 7 and 12. In another embodiment, pump 60 is located remote to enclosure 20. See FIG. 14. In a preferred embodiment, conductor 526 is mounted inside enclosure 20 and a plurality of jetting nozzles 524 are arranged around open bottom 28. In another embodiment, conductor 526 passes through enclosure 20 and a jetting nozzle 524 is positioned within enclosure 20 at open bottom 28. It is contemplated that conductor 526 can be rigid, flexible or a combination thereof.

A slurry evacuation system 54 includes a slurry conductor 542 with at least one inlet or suction fluid inlet 5422 positioned within an enclosure 20 and at least one outlet or discharge fluid outlet 5424 positioned outside enclosure 20. In a preferred embodiment, a slurry pump 56 is fluidly connected to a slurry conductor 542 to optimize the extraction of slurry 104 at a user selected flow rate from enclosure 20. In a preferred embodiment, a significant portion of slurry conductor 542 is mounted within enclosure 20. In another embodiment, a significant portion of slurry conductor 542 is mounted outside enclosure 20. In yet another embodiment, a significant portion of slurry conductor 542 is not mounted to enclosure 20. In yet another embodiment, suction fluid inlet 5422 having a shape similar to a periphery of a structure 08 to allow landing of an eductor 50 on a portion of structure 08.

In a preferred embodiment, a lifting beam 80 is fixed to enclosure 20 to orient, lower, raise or a combination thereof an enclosure 20 above a structure 08 when lifting beam 80 is connected to a lifting appliance 92. See FIG. 9. In one embodiment, lifting appliance 92 is a crane. In a preferred embodiment, lifting appliance 92 is a crane attached to a craft 90. A portion of craft 90 is in a body of water 02 over soil 01. See FIGS. 12-14. It is contemplated that craft 90 can be a vessel, boat, ship, barge, mobile offshore drilling unit, liftboat, spar, submarine, remotely operated underwater vehicle or a combination thereof. It is further contemplated that lifting appliance 92 is fixed to a marine structure 91 such as a platform, jacket, subsea structure or a combination thereof. In a preferred embodiment, a hydraulic excavation and delivery device 10 suspended by a lifting appliance 92 beneath the water's surface 04 is positioned by thrusters 76 fixed to footing frame 70 slideably attached to enclosure 20. A video camera 72 attached to hydraulic excavation and delivery device 10 assists at least in the positioning of enclosure 20. In a preferred embodiment, underwater lighting 74 is attached to hydraulic excavation and delivery device 10 to at least improve visibility adjacent to enclosure 20. In yet another preferred embodiment, a tracking system 78 is fixed to hydraulic excavation and delivery device 10 to at least improve positioning of enclosure 20. It is contemplated that an umbilical 96 conveys signal, power, fluid or a combination thereof between a control room 98 on or in a craft 90 or marine structure 91 and an article in position sensor 364, an article in position indicator 3642, an article actuator 366, a landing sensor 46, a landing indicator 462, slurry pump 56, pump 60, a video camera 72, an underwater light 74, a thruster 76, a tracking system 78, craft 90 or a combination thereof. It is further contemplated that umbilical 96 could be wrapped and stowed on a reel 94 on or in a craft 90 or marine structure 91.

In a preferred embodiment, craft 90 is an remotely operated underwater vehicle with a grappling arm 922 holding a handle 222 projected from enclosure 20. See FIG. 14. Motive fluid 102 is provided by a pump 70 located on a remotely operated underwater vehicle and enters a conductor 526 via a motive fluid inlet 528. See FIG. 14. In a preferred embodiment, slurry pump 56 located on a remotely operated underwater vehicle. Slurry pump 56 fluidly connected to a discharge fluid outlet 5424 to optimize removal of slurry 104 away from enclosure 20.

In a preferred methodology of operating a hydraulic excavation and delivery device 10 the following steps are included: loading and fixing an article to an alignment frame 326 by a latch 362; lowering the hydraulic excavation and delivery device 10 to the surface of the soil 01 by a lifting appliance 92 located on a craft 92 or marine structure 91; positioning hydraulic excavation and delivery device 10 on the surface of the soil 01 directly above a buried structure 08 by a remotely operated underwater vehicle 92, a diver, a thruster 76 or a combination thereof; application of fluid pressure or power to hydraulic excavation and delivery device 10 to operate fluid jetting system 52, slurry evacuation system 54 or a combination thereof; sinking hydraulic excavation and delivery device 10 into soil 01 as soil within and adjacent to hydraulic excavation and delivery device 10 is removed; exposing a portion of buried structure 08; stop sinkage of hydraulic excavation and delivery device 10 when a user defined amount of exposed buried structure 08 is within recess 3262 by shutting off pump 60, shutting off slurry pump 56, activating lifting apparatus 92 or a combination thereof; article 31 released and delivered from alignment frame 326 to exposed portion of buried structure 08; operation of at least one function of article 31 by an article actuator 366; and removal of hydraulic excavation and delivery device 10 from the soil by activation of lifting appliance 92, operation of pump 50, operation of slurry pump 56 or a combination thereof. In a preferred methodology, the additional step of filling in the excavated area can be accomplished by common jetting or dredging techniques known to those skilled in the art of structural burial.

It is further contemplated that a hydraulic excavation and delivery device 10 may also be used to provide an excavated space, inside the enclosure 10 were other types of activities may be carried out, including but not limited to monitoring, inspection, hot tapping, maintenance, repair or a combination thereof.

The above and other features of the invention including various novel method steps and a system of the various elements have been particularly described. It will be understood that the particular process and construction of parts embodying the invention by way of illustration only and not as a limitation of the invention. The principles and features of this invention may be employed in varied and numerous embodiments without departing from the scope of the invention as defined by the appended claims.

The invention claimed is:

1. A hydraulic excavation and delivery device for a structure buried in soil comprising:
    an enclosure with an open bottom located at a lower region of said enclosure, wherein said lower region is configured to contact the soil above the structure;
    a footing frame, slideably fixed to said enclosure to orient said enclosure above the structure, and generally normal to the soil surface when said footing frame is in contact with the soil;
    an aperture formed in said lower region, said aperture having a shape similar to a periphery of the structure to allow landing of said enclosure on a portion of said structure;
    a fluid jetting system fixed to said enclosure to simultaneously introduce fluid at a user selected flow rate within said enclosure, hydraulically excavate the soil within said lower region, and create a slurry of said fluid and soil within said enclosure;
    a slurry evacuation system fixed to said enclosure to evacuate said slurry from said enclosure at a user selected evacuation flow rate; and
    an article alignment system, said article alignment system fixed within said enclosure to hold, align, deliver and release an article to the structure when at least a portion of the structure is within said aperture.

2. A hydraulic excavation and delivery device as claimed in claim 1, wherein said article alignment system comprises:
    a frame pivotally attached to said enclosure; and
    an article latch system attached to said frame and located in said lower region.

3. A hydraulic excavation and delivery device as claimed in claim 1 further comprising a landing system to at least reduce the landing force of said enclosure on said portion of the structure, wherein said landing system comprises a dashpot fixed between said enclosure and a landing bar positioned across an interior region of said aperture to make contact with said portion of the structure before said delivery of said article to said structure.

4. A hydraulic excavation and delivery device as claimed in claim 1 wherein said fluid jetting system comprises:
    a fluid source fluidly connected to a suction side of a pump;
    a discharge side of said pump fluidly connected to a first end of a conductor; and
    a jetting nozzle fluidly connected to a second end of said conductor, said jetting nozzle positioned in said enclosure to optimize said simultaneous fluid introduction, hydraulic soil excavation and slurry creation.

5. A hydraulic excavation and delivery device as claimed in claim 1, wherein said slurry evacuation system comprises:
    a slurry conductor with at least one inlet positioned within said enclosure and at least one outlet positioned outside said enclosure; and
    a slurry pump fluidly connected to said slurry conductor to enhance slurry removal from said enclosure.

6. A hydraulic excavation and delivery device for a structure buried in soil comprising:
    an enclosure with an open bottom located at a lower region of said enclosure, wherein said lower region is configured to contact the soil above the structure;
    an aperture formed in said lower region, said aperture having a shape similar to a periphery of the structure to allow landing of said enclosure on a portion of said structure;
    a fluid jetting system fixed to said enclosure to simultaneously introduce fluid at a user selected flow rate within said enclosure, hydraulically excavate the soil within said lower region, and create a slurry of said fluid and soil within said enclosure;
    a slurry evacuation system fixed to said enclosure to evacuate said slurry from said enclosure at a user selected evacuation flow rate;
    an article alignment system, said article alignment system fixed within said enclosure to hold, align, deliver and release an article to the structure when at least a portion of the structure is within said aperture;
    a lifting beam fixed to said enclosure to orient, lower or raise said enclosure above the structure; and
    a lifting appliance attached to said lifting beam to cause said orientation, lowering or raising of said enclosure above the structure.

7. A hydraulic excavation and delivery device as claimed in claim 6, further comprising:
    at least a portion of a craft, said lifting appliance positioned on said craft; and
    an umbilical to convey power, fluid or a combination thereof, between said craft and one or more of a slurry pump or pump of the slurry evacuation system or the fluid jetting system.

8. A hydraulic excavation and delivery device as claimed in claim 6, further comprising said article releasably attached to said article alignment system, wherein said article is a cathodic protection clamp.

9. A hydraulic excavation and delivery device as claimed in claim 6, further comprising:
- at least a portion of a craft, said lifting appliance positioned on said craft; and
- an umbilical to convey signal, power, fluid or a combination thereof, between a control room positioned on or in said craft and one or more of a video camera, a underwater light, a thruster or a combination thereof.

10. A hydraulic excavation and delivery device as claimed in claim 6, further comprising a remotely operated vehicle releasably attached to the hydraulic excavation and delivery device by a grappling arm.

11. A hydraulic excavation and delivery device as claimed in claim 10, further comprising:
- a pump fixed to said remotely operated vehicle;
- a discharge side of said pump fluidly connected to a first end of a conductor; and
- a jetting nozzle fluidly connected to a second end of said conductor, said jetting nozzle positioned in said enclosure to optimize said simultaneous fluid introduction, hydraulic soil excavation and slurry creation.

12. A hydraulic excavation and delivery device as claimed in claim 10, further comprising:
- a slurry conductor with at least one inlet positioned within said enclosure and at least one outlet positioned outside said enclosure; and
- a slurry pump fixed to said remotely operated vehicle and fluidly connected to said outlet to optimize removal of said slurry away from said enclosure.

13. A hydraulic excavation and delivery device as claimed in claim 6, further comprising a footing frame, slideably fixed to said enclosure to orient said enclosure above the structure when said footing frame is in contact with the soil.

14. A hydraulic excavation and delivery device for a structure buried in soil comprising:
- an enclosure with an open bottom located at a lower region of said enclosure, wherein said lower region is configured to contact the soil above the structure;
- an aperture formed in said lower region, said aperture having a shape similar to a periphery of the structure to allow landing of said enclosure on a portion of said structure;
- a fluid jetting system fixed to said enclosure to simultaneously introduce fluid at a user selected flow rate within said enclosure, hydraulically excavate the soil within said lower region, and create a slurry of said fluid and soil within said enclosure;
- a slurry evacuation system fixed to said enclosure to evacuate said slurry from said enclosure at a user selected evacuation flow rate;
- an article alignment system, said article alignment system fixed within said enclosure to hold, align, deliver and release an article to the structure when at least a portion of the structure is within said aperture; and
- said article releasably attached to said article alignment system, wherein said article is a cathodic protection clamp.

15. A hydraulic excavation and delivery device as claimed in claim 14, wherein said article alignment system comprises:
- a frame pivotally attached to said enclosure; and
- an article latch system attached to said frame and located in said lower region,
- wherein said article is releasably attached to said article latch system.

16. A hydraulic excavation and delivery device for a structure buried in soil comprising:
- an enclosure with an open bottom located at a lower region of said enclosure, wherein said lower region is configured to contact the soil above the structure;
- an aperture formed in said lower region, said aperture having a shape similar to a periphery of the structure to allow landing of said enclosure on a portion of said structure;
- a fluid jetting system fixed to said enclosure to simultaneously introduce fluid at a user selected flow rate within said enclosure, hydraulically excavate the soil within said lower region, and create a slurry of said fluid and soil within said enclosure;
- a slurry evacuation system fixed to said enclosure to evacuate said slurry from said enclosure at a user selected evacuation flow rate;
- an article alignment system, said article alignment system fixed within said enclosure to hold, align, deliver and release an article to the structure when at least a portion of the structure is within said aperture;
- a suction fluid inlet, said suction fluid inlet positioned within a lower region of said enclosure, said suction fluid inlet having a shape similar to a periphery of the structure to allow landing of said enclosure on a portion of said structure;
- a motive fluid inlet;
- a pump fluidly connected between a fluid source and said motive fluid inlet; and
- a jetting nozzle positioned in said enclosure to simultaneously hydraulically excavate the soil within said suction fluid inlet, and create a slurry of said fluid and soil within said enclosure.

17. A hydraulic excavation and delivery device as claimed in claim 16, further comprising a user operated articulating video camera fixed to the hydraulic excavation and delivery device.

18. A hydraulic excavation and delivery device as claimed in claim 16, further comprising a user operated thruster fixed to the hydraulic excavation and delivery device.

19. A hydraulic excavation and delivery device as claimed in claim 16, further comprising a user operated light fixed to the hydraulic excavation and delivery device.

20. A hydraulic excavation and delivery device as claimed in claim 16, further comprising a tracking system fixed to the hydraulic excavation and delivery device.

* * * * *